United States Patent
Ackley et al.

(10) Patent No.: US 6,371,375 B1
(45) Date of Patent: Apr. 16, 2002

(54) METHOD AND APPARATUS FOR ASSOCIATING DATA WITH A WIRELESS MEMORY DEVICE

(75) Inventors: H. Sprague Ackley, Seattle; Christopher A. Wiklof, Everett, both of WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/249,359

(22) Filed: Feb. 12, 1999

Related U.S. Application Data

(63) Continuation-in-part of application No. 09/064,886, filed on Apr. 20, 1998, now Pat. No. 6,056,199, which is a continuation-in-part of application No. 08/978,608, filed on Nov. 26, 1997, now abandoned, which is a continuation of application No. 08/533,568, filed on Sep. 25, 1995, now abandoned, application No. 09/249,359, which is a continuation-in-part of application No. 09/021,608, filed on Feb. 10, 1998.

(51) Int. Cl.[7] .................................................. G06K 7/10
(52) U.S. Cl. .............................. 235/462.45; 235/462.46
(58) Field of Search ........................ 235/462.45, 462.46

(56) References Cited

U.S. PATENT DOCUMENTS

| | | |
|---|---|---|
| 4,056,710 A | 11/1977 | Shepardson et al. |
| 4,079,482 A | 3/1978 | Yeh |
| 4,307,293 A | 12/1981 | Lazzarotti et al. |

(List continued on next page.)

FOREIGN PATENT DOCUMENTS

| | | |
|---|---|---|
| DE | 33 30 261 | 3/1985 |
| EP | 0 667 592 A1 | 8/1995 |
| FR | 2 760 209 | 9/1998 |
| JP | 10040329 | 2/1998 |
| WO | WO 95/12863 | 5/1995 |
| WO | WO 96/13803 | 5/1996 |
| WO | WO 98/47101 | 10/1998 |

OTHER PUBLICATIONS

AIM International, Inc., International Symbology Specification—Data Matrix:, May 8, 1997, pp. 1–95.
AIM International, Inc., "International Symbology Specification MaxiCode", May 8, 1997, pp. 1–44.

(List continued on next page.)

*Primary Examiner*—Harold I. Pitts
(74) *Attorney, Agent, or Firm*—Seed IP Law Group, PLLC

(57) ABSTRACT

A system for storing and retrieving data comprises a memory device, such as a radio frequency tag, having a memory for storing the data, a first identifier stored in the memory, and a machine-readable symbol associated with the memory device. At least a portion of the machine-readable symbol encodes a second identifier logically associable with the first identifier. The machine-readable symbol may be printed on an RF tag, or may be carried by a container that also carries an RF tag. The machine-readable symbol is composed of characters from a machine-readable symbology, and includes a flag character that indicates the existence of a memory device corresponding to the machine-readable symbol. A reader for reading the machine-readable symbol and the memory device conserves power by determining from the flag character whether a memory device is associated with the symbol, prior to operating a memory device reader section of the reader. The reader reads the machine-readable symbol to obtain a symbol identifier, and successively reads each of a number of memory devices to obtain a memory device identifier until a memory device identifier corresponding to the symbol identifier is found. Alternatively, the reader may successively read each of the number of memory devices to obtain each of the memory device identifiers, read the machine-readable symbol to obtain a symbol identifier, and match the symbol identifier to one of the memory device identifiers.

6 Claims, 9 Drawing Sheets

U.S. PATENT DOCUMENTS

| | | | |
|---|---|---|---|
| 4,523,087 A | 6/1985 | Benton | |
| 4,567,361 A | 1/1986 | Rosenthal | |
| 4,575,621 A | 3/1986 | Dreifus | |
| 4,589,144 A | 5/1986 | Namba | |
| 4,728,784 A | 3/1988 | Stewart | |
| 4,782,221 A | 11/1988 | Brass et al. | |
| 4,786,792 A | 11/1988 | Pierce et al. | |
| 4,792,910 A | 12/1988 | Lange | |
| 4,794,239 A | 12/1988 | Allais | |
| 4,810,867 A | 3/1989 | Speicher | |
| 4,823,311 A * | 4/1989 | Hunt et al. | 235/472.01 |
| 4,827,395 A | 5/1989 | Anders et al. | |
| 4,841,128 A | 6/1989 | Gröttrup et al. | |
| 4,916,296 A | 4/1990 | Streck | |
| 4,980,544 A | 12/1990 | Winter | |
| 5,097,263 A | 3/1992 | Delpech et al. | |
| 5,128,526 A | 7/1992 | Yoshida | |
| 5,184,005 A | 2/1993 | Ukai et al. | |
| 5,204,515 A | 4/1993 | Yoshida | |
| 5,216,233 A | 6/1993 | Main et al. | |
| 5,280,159 A | 1/1994 | Schultz et al. | |
| 5,298,731 A | 3/1994 | Ett | |
| 5,324,922 A | 6/1994 | Roberts | |
| 5,324,927 A | 6/1994 | Williams | |
| 5,380,998 A | 1/1995 | Bossen et al. | |
| 5,382,784 A | 1/1995 | Eberhardt | |
| 5,387,783 A | 2/1995 | Mihm et al. | |
| 5,389,770 A | 2/1995 | Ackley | |
| 5,420,403 A | 5/1995 | Allum et al. | |
| 5,434,401 A | 7/1995 | Bauser | |
| 5,434,572 A | 7/1995 | Smith | |
| 5,484,997 A | 1/1996 | Haynes | |
| 5,489,908 A | 2/1996 | Orthmann et al. | |
| 5,521,601 A | 5/1996 | Kandlur et al. | |
| 5,528,222 A | 6/1996 | Moskowitz et al. | |
| 5,539,191 A | 7/1996 | Ackley | |
| 5,550,547 A | 8/1996 | Chan et al. | |
| 5,552,591 A | 9/1996 | Bossen et al. | |
| 5,553,084 A | 9/1996 | Ackley et al. | |
| 5,557,092 A | 9/1996 | Ackley et al. | |
| 5,563,402 A | 10/1996 | Reddersen et al. | |
| 5,594,228 A | 1/1997 | Swartz et al. | |
| 5,612,531 A | 3/1997 | Barkan | |
| 5,619,027 A | 4/1997 | Ackley | |
| 5,640,002 A | 6/1997 | Ruppert et al. | |
| 5,673,037 A | 9/1997 | Cesar et al. | |
| 5,761,219 A | 6/1998 | Maltsev | |
| 5,763,867 A | 6/1998 | Main et al. | |
| 5,767,498 A | 6/1998 | Heske, III et al. | |
| 5,777,310 A | 7/1998 | Liu et al. | |
| 5,811,781 A | 9/1998 | Ackley | |

OTHER PUBLICATIONS

AIM USA, "Understanding 2D Symbologies, A Detailed Overview and Technical Introduction", Copyright 1999, pp. 1–50.

AIM USA, "Uniform Symbology Specification Code 128", American National Standards Institute, Inc., Approved Aug. 16, 1995, pp. 1–12.

AIM USA, "Uniform Symbology Specification Code 16K", American National Standards Institute, Inc., Approved Aug. 16, 1995, pp. 1–17.

AIM USA, "Uniform Symbology Specification Code 49", American National Standards Institute, Inc., Approved Aug. 16, 1995, pp. 1–26.

AIM USA, "Uniform Symbology Specification Code One", Jul. 1994, pp. 1–32.

AIM USA, "Uniform Symbology Specification PDF417", Jul. 1994, pp. 1–34.

International Product Code (IPC)–2D Symbology Specification, Version: Sep. 7, 1997, pp. 1–7.

International Product Code (IPC)–13 Symbology Specification (preliminary), Version: Sep. 4, 1997, pp. 1–10.

International Product Code (IPC)–14 Symbology Specification (preliminary), Version: Sep. 1, 1997, pp. 1–9.

*The Unicode Standard Worldwide Character Encoding*, Version 1, vol. 1, The Unicode Consortium, Addison–Wesley Publishing Company, Inc., Massachusetts, 1991, pp. 1–6, and 340.

*Uniform Symbology Specification Code 93*, AIM USA, Apr. 1993, pp. 1–10..

Walker, Nathan, "ASCII–based compaction eases bar–code decoder's work," *Electronic Design* 30(22), 163–166, Oct. 1982.

Alphanumeric Data Compaction, Rev. C., Intermec Corporation, Everett, Washington, 1992, 6 pages.

"Bar Code Compression Decompression," *IBM Technical Disclosure Bulletin* 32:12, May 1990, pp. 288–290.

*Bar Code Print Quality—Guideline*, ANSI X3. 182–1990, pp. 1–29.

Codablock F (128), Bar Coding—Symbology Specification—Codablock, ICS International AG, 1993, pp. 1–44.

Dallas Semiconductor Corporation, Book of DS199x Touch Memory Standards, 1992.

Extended Channel Interpretation (ECI) Assignments, Release 2, ECI Assignments, Aug., 1995, pp. 1–13.

Information processing—8 bit single–byte coded graphic character sets—, Part 1: Latin alphabet No. 1, ISO 8859–1:1987 (E), pp. 1–7.

Information processing—8–bit single–byte coded graphic character sets, Part 4: Latin alphabet No. 4, ISO 8859–4:1988 (E), pp. 1–5.

Palmer, Roger C., "Symbologies," *The Bar Code Book*, 2d ed., Chapter 4, Halmers Publishing, Inc., New Hampshire, 1991, pp. 15–59.

Schuessler, Rick, Using Extended Channel Interpretations (ECI's) for International Character Set Standardization, Scan–Tech Proceedings, Chicago, Nov., 1996, pp. 294–305.

* cited by examiner

METHOD AND APPARATUS FOR ASSOCIATING DATA WITH A WIRELESS MEMORY DEVICE

CROSS-REFERENCES TO RELATED APPLICATIONS

This application is a continuation-in-part of U.S. patent application Ser. No. 09/064,886, filed Apr. 20, 1998, now U.S. Pat. No. 6,056,199, which is a continuation-in-part of U.S. patent application Ser. No. 08/978,608, filed Nov. 26, 1997, now abandoned, which is a continuation of U.S. patent application Ser. No. 08/533,568, filed Sep. 25, 1995, now abandoned. This application is also a continuation-in-part of U.S. patent application Ser. No. 09/021,608, filed Feb. 10, 1998, currently pending.

TECHNICAL FIELD

The present invention relates to readable and/or writable memory devices, such as radio frequency memory tags.

BACKGROUND OF THE INVENTION

A variety of methods exist for tracking and providing information about items. For example, inventory items in stores typically bear printed labels providing information such as serial numbers, price, weight, and size. Some labels include machine-readable symbols, such as bar code symbols, which may be selected from a variety of symbologies. These labels contain a limited amount of information due to space constraints. Updating the information on these labels typically requires the printing of a new label to replace the old label.

Memory devices such as radio frequency ("RF") tags provide an alternative method of tracking and providing information about items. Memory devices permit large amounts of data to be associated with an object or item. Memory devices typically include a memory and logic in the form of an integrated circuit ("IC") and means for transmitting data to and from the memory. For example, an RF tag typically includes a memory, an RF transmitting section, an RF receiving section, an antenna, and logic for controlling the memory, the RF transmitting section and the RF receiving section. RF tags are generally formed on a substrate and may include, for example, analog RF circuits and digital logic and memory circuits. The RF tags may also include a number of discrete components, such as capacitors and diodes where such is advantageous.

The RF tags may be either passive or active devices. Active devices are self-powered, by a battery, for example. Passive devices do not contain a power source, but derive their energy from the RF signal used to interrogate the RF tag. Passive RF tags usually include an analog circuit which detects and decodes the interrogating RF signal and which provides power from the RF field to a digital circuit in the tag. The digital circuit generally executes all of the functions performed by the RF tag, such as retrieving stored data from memory and modulating the RF signal to transmit the retrieved data. In addition to retrieving and transmitting data previously stored in the memory, the RF tag may permit new or additional information to be stored into the RF tag's memory or may permit the RF tag to manipulate data or perform some additional functions.

A significant drawback of memory devices such as RF tags is the inability to associate a specific memory device, or item to which it is attached, with a given data signal. For example, where a number of longer range RF tags (e.g., range greater than approximately 6 inches) are in relatively close proximity to one another, a reader will receive data from all of the RF tags in either a defined sequence or a random sequence. However, the reader is unable to associate the received data with any particular RF tag. So, while a user may determine that a particular item is present among a number of items or containers, the user is unable to specifically identify which one of the items or containers the data describes.

Attempts have been made to overcome this problem. For example, one cost-effective means of associating data with a particular item is to physically move each item out of range of the reader until the desired item is identified. Another attempt includes the use of triangulation. However triangulation has accuracy limitations and requires multiple pieces of equipment or multiple sampling of data at different locations.

SUMMARY OF THE INVENTION

In one aspect of the invention, a system for storing and retrieving data comprises a memory device such as a radio frequency tag having a memory for storing the data, a first identifier stored in the memory of the memory device, and a machine-readable symbol associated with the memory device, where at least a portion of the machine-readable symbol encodes a second identifier logically associable with the first identifier. The machine-readable symbol may, for example, be printed on the memory device, or may be carried by a container that also carries the memory device. The data stored in the memory device may include data related to the container or items carried by the container.

In another aspect of the invention, at least a portion of a machine-readable symbol includes a flag, the flag being logically associated with the existence of a memory device such as an RF tag corresponding to the machine-readable symbol. The flag is set to a first value when an RF tag corresponding to the machine-readable symbol exists, and to a second value when an RF tag does not exist. Thus, a reader reading the machine-readable symbol is able to determine whether an RF tag exists and may control an RF portion of the reader appropriately.

Similarly, in another aspect of the invention, a machine-readable symbology includes a number of symbol characters, including a flag character that indicates that at least one memory device corresponding to the machine-readable symbol exists.

In another aspect of the invention, a method of conserving power in a reader includes operating a symbol reading portion of the reader to read a symbol, determining whether a memory device is associated with the symbol from the data encoded in the read symbol, and operating a memory device reader portion of the reader if a memory device is associated with the symbol.

In yet another aspect of the invention, a method of associating a machine-readable symbol with data stored in one of a number of memory devices includes reading the machine-readable symbol to obtain a symbol identifier, and successively reading each of a number of memory devices to obtain a memory device identifier and comparing the memory device identifier and the symbol identifier, until a memory device is read that has a memory device identifier that corresponds to the symbol identifier.

In a further aspect of the invention, a method of associating a machine-readable symbol with data stored in one of a number of memory devices includes successively reading each of the number of memory devices to obtain a memory device identifier for each of the number of memory devices, reading the machine-readable symbol to obtain a symbol identifier, and matching the symbol identifier to the memory device identifier of one of the number of memory devices.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with memory devices, integrated circuits, radio frequency communications, symbologies, and readers have not been shown in detail to avoid unnecessarily obscuring the description of the embodiments of the invention.

Figure 1:
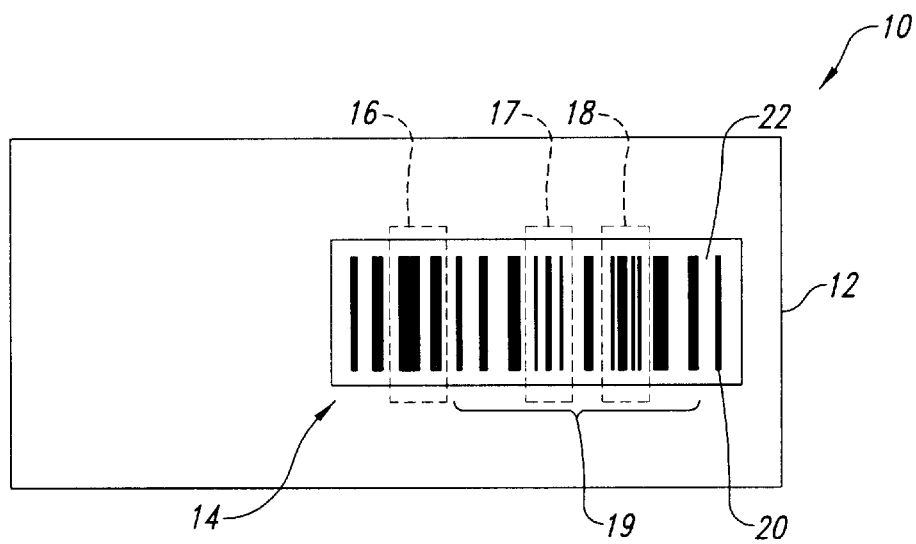
FIG. 1 is a top plan view of an RF tag incorporating a machine-readable symbol and an RF readable and writable memory device.

FIG. 1 shows a memory device in the form of a radio frequency ("RF") tag 10 formed as a substrate 12. The substrate 12 is adapted for repeatable attachment and detachment to various objects using known attachment means, such as hook and loop fastener commonly available as Velcro®, so that the RF tags 10 are reusable. Alternatively, the RF tag 10 can be a single use device, including a pressure sensitive adhesive and release liner (not shown) on the substrate 12.

A machine-readable symbol, such as the bar code symbol 14, is carried by the substrate 12, such that the bar code symbol 14 is perceptually associable with the RF tag 10. Any conventional means for placing the bar code symbol 14 on the substrate 12 may be employed, such as printing or silk screening directly onto the substrate 12. Alternatively, the bar code symbol 14 may be printed on a label and the label applied to the substrate 12 or attached in some other fashion.

The bar code symbol 14 is a pattern of regions of varying reflectance on an exposed portion of the substrate 12 that reflects some of the light from an illumination source. The bar code symbol 14 includes a number of characters, three of which are identified by the broken line boxes 16, 17, 18 in FIG. 1. Each character is composed of a number of lines 20 and spaces 22 of varying widths. The characters 16–18 are selected from a set of characters known as a symbology. Numerous symbologies are known and may include bar code symbologies such as UPC, EAN, Code 39, and Code 93i; "multi-row" or "stacked" symbologies such as PDF-417 and Code 49; and "area" symbologies such as Code One. The bar code symbol 14 represents a bar code symbol composed of characters selected from the Code 93i symbology. The characters of the bar code symbol 14 encode data including a symbol identifier 19.

One of the characters 16 in the bar code symbol 14 may indicate the existence of a companion data carrier (e.g., a memory device such as an RF tag). For example, a version of Code 93i proposed in U.S. patent application Ser. No. 09/021,608, filed Feb. 10, 1998, describes the use of such a flag character. The flag character 16 indicates the existence of an RF tag 10 when positioned in the first position following the start character. One or more character values following the initial flag character in the first position are either "modifier" characters that identify adjacent tag indication values and that provide specific reader instructions to assist in the decode and data management of the RF tag 10. Alternatively, the flag character 16 may be placed in the last position before the check or error correction characters. Companion data carriers typically encode supplementary data related to the 93i symbol to which it is a companion. When a reader scans or images a 93i symbol having the 93i start and stop characters, or a symbol having other 93i start/stop characters with the appropriate flag character, the reader understands that an associated RF tag 10 exists and therefore attempts to collect data from the RF tag 10.

Figure 2:
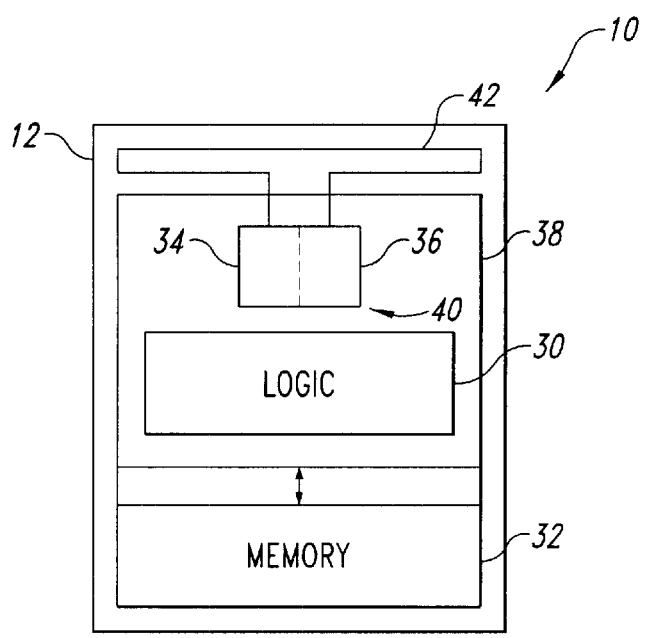
FIG. 2 is a block diagram of the RF tag of FIG. 1.

FIG. 2 shows the passive RF memory tag 10 as a block diagram. The RF tag 10 includes a memory 32, an RF detector 34, and an RF emitter 36, all coupled by a logic 30. The RF detector 34 and the RF emitter 36 may be integrally formed in an integrated circuit 38 as an RF transceiver 40, sharing a common antenna 42. Alternatively, the RF detector 34 may be an RF receiver coupled to the antenna 42, while the RF emitter 36 may be an RF transmitter coupled to a separate antenna (not shown).

The integrated circuit 38 may include an analog circuit comprising the RF transceiver 40, and a digital circuit comprising the logic 30 and the memory 32. The logic 30 may take the form of microcode, a hardwired circuit or a combination of microcode and a hardwired circuit. The RF detector 34 converts an RF signal from the antenna 42 to a DC voltage that powers up the logic 30 and transmits information and commands for storing and retrieving data from the memory 32. The digital circuit generally executes all of the functions of the RF memory tag 10, such as retrieving stored data from the memory 32 and modulating the RF signal to transmit the retrieved data. The substrate 12 serves as a protective housing, enclosing the various components. While the RF tag 10 shown is a passive device, a self-powered active device may be successfully employed.

The logic 30, in the form of a microprocessor or microcontroller, controls data transfer and electrical operation of the RF tag 10 in a manner known in the art using a manufacturer-identified protocol.

Figure 3:
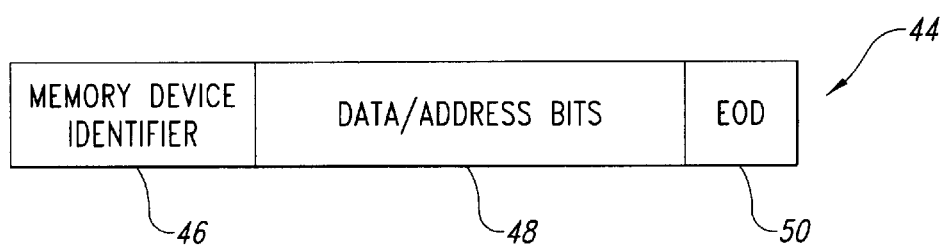
FIG. 3 is a data structure for data transmitted according to the protocol of the RF tag.

FIG. 3 shows a simple data structure 44 for the memory 32. The data structure 44 includes a memory device identifier 46, data or address bits 48, and an end of data field indicator 50. The memory device identifier 46 contains a unique identifier for the specific RF tag 10. The data or address bits 48 contain data relating to an object or item associated with the RF tag 10. The end of data field indicator 50 indicates the end of data.

Figure 4:
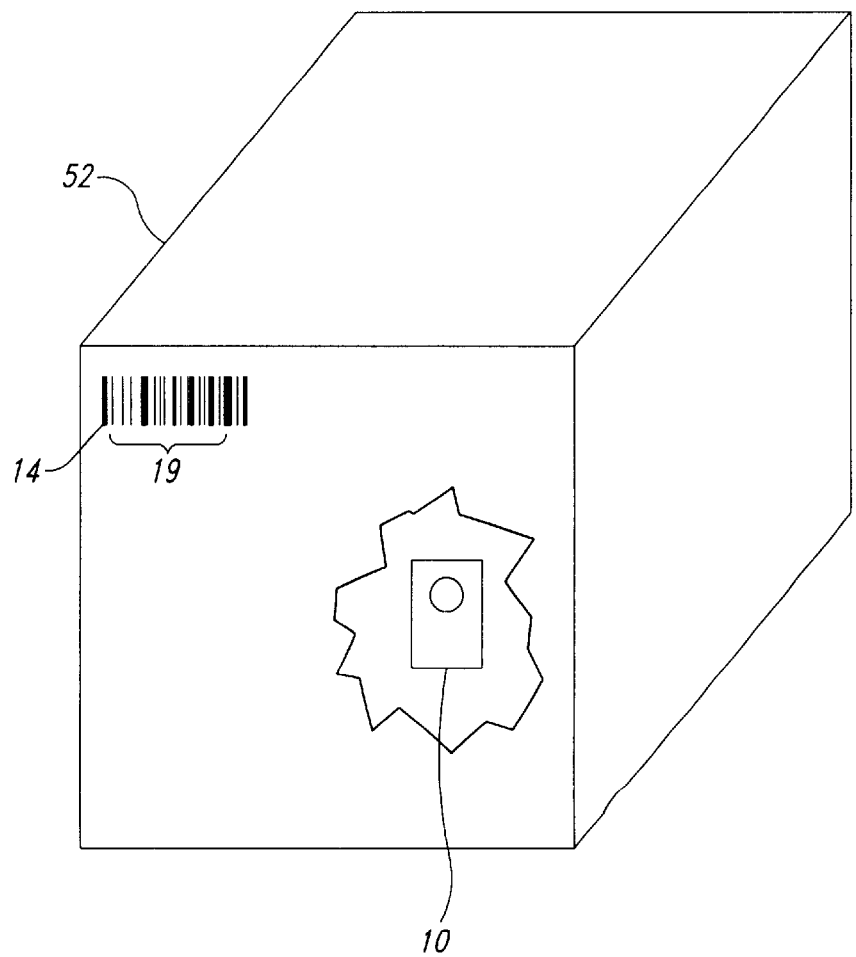
FIG. 4 is an isometric, partially broken view of a container carrying a machine-readable symbol and an RF tag.

While FIG. 1 shows the bar code 14 carried by the substrate 12, there are other ways of perceptually linking or associating the bar code symbol 14 and the RF tag 10. For example, in FIG. 4, a container 52 carries the bar code symbol 14 on a visible surface of the container 52. The RF tag 10 is enclosed within the container 52, or may be carried on a visible or non-visible surface of the container 52. The container 52 may also contain one or a number of various items (not shown). Data relating to the items located in the container 52 may be stored in the memory 32 of the RF tag 10. The RF tag 10 also stores a memory device identifier 46 (FIG. 3). At least a portion of the bar code symbol 14 encodes characters representing a symbol identifier 19 (FIG. 1). The symbol identifier 19 is logically associable to the memory device identifier 46.

The symbol identifier 19 may take the form of a multi-character alphanumeric identifier. The memory device identifier 46 may also take the form of a multi-character alphanumeric identifier and may be identical to the symbol identifier 19. Alternatively, the symbol identifier 19 and, or the memory device identifier 46 may be an address that points to a memory location containing a unique identifier. Additional ways of linking or associating the symbol identifier 19 and the memory device identifier 46 are within the scope of the invention, as those skilled in the relevant art will appreciate.

Figure 5:
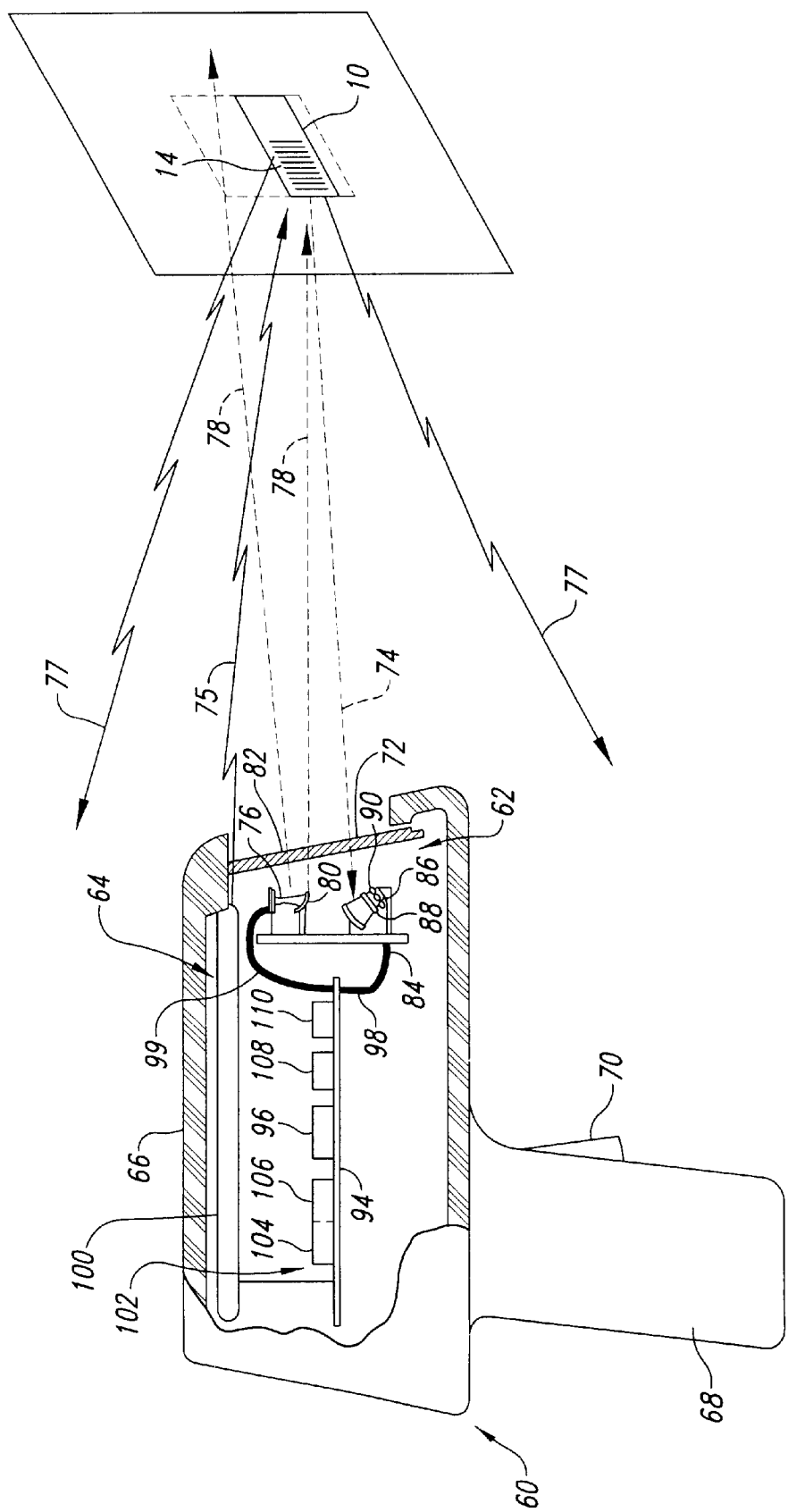
FIG. 5 is a side cross-sectional view of a reader including a symbol reader portion and a memory device reader portion.

FIG. 5 shows a reader 60 for reading an RF tag 10 including the ability to read other machine-readable symbols such as the bar code symbol 14. The reader 60 includes a head 66, a handle 68, and a trigger 70 for activating the reader 60. The reader 60 further includes a symbol reader section 62 for reading the bar code symbol 14 and an RF reading section 64 for transmitting data to and from the memory 32 of the RF tag 10.

With respect to the symbol reader section 62, the head 66 includes a window 72 for receiving light reflected from the bar code symbol 14, shown as broken-line arrow 74. The bar code symbol 14 may reflect ambient light or may reflect an illuminating beam that the reader produces with one or more laser diodes 76, the illuminating beam shown as broken-line arrows 78. The illuminating beam 78 is directed out of the reader 60, for example, with the assistance of a mirror 80 and lens 82. The reader 60 may produce the illuminating beam 78 as a scanning beam by employing a scanning motor (not shown) to pivot the mirror 80 through a selected angular range such that when the light from the laser diode 76 strikes the mirror 80, the light is swept through a corresponding angular range, thus forming the scanning beam. The structure and operation of such a combination is well known in the art. Alternatively, the reader 60 may employ a fixed illumination beam 78 and electronic means for scanning the reflected beam 74. Electronic means for scanning the reflected beam 74 are also well known in the art.

The symbol reader section 62 may further include a gathering mirror 84 that gathers the reflected light 79 and directs it toward a photodetector 86 through a lens 88. To reduce the sensitivity of the photodetector 86 to ambient light, a wavelength selective optical filter 90 may be placed between the lens 88 and the photodetector 86. The photodetector 86 may take the form of a linear array of photosensitive elements, preferably a charged coupled device ("CCD") having, for example, linear active surface pixel elements. While the depicted embodiment of the symbol reader section 62 is of a laser scanner, the symbol reader section 62 can employ other known reading systems and imagers, such as Vidicons, two-dimensional semiconductor arrays, or a two-dimensional CCD array. Additionally, other sized CCD arrays may be used, for example, circular or square CCD arrays.

Furthermore, while the exemplary embodiment of the photodetector 86 is of a linear imager, those skilled in the relevant art will readily recognize that other image digitizing or capturing devices can be employed, including color sensitive devices. The reader 60 may employ electronic means to selectively sample each pixel element of the photodetector 86 to effectively scan the bar code symbol 14. This eliminates the need for a scanning illumination beam, and the equipment to produce such a scanning illumination beam. Thus, the symbol reader section 62 may be significantly simplified by reducing the number of moving parts.

The photodetector 86 converts the reflected light into an electrical signal and couples the electrical signal by way of electrical lead 98 to a printed circuit board 94 carrying a microprocessor 96. The microprocessor 96 receives the electrical signal from the photodetector 86 and decodes the electrical signal to identify the information represented by the bar code symbol 14. The microprocessor 96 also controls the laser diode 76 via a lead 99.

The RF section 64 of the reader 60 includes an antenna 100 coupled to a transceiver 102 that includes a transmitter 104 and a receiver 106. The transmitter 104 is capable of producing RF interrogation signals, shown as zigzag lines 75, to interrogate and transmit data to the RF tag 10. The receiver 106 is capable of receiving RF data signals 77 from the RF tag 10. One skilled in the art will note that the transmitter 104 and receiver 106 may be formed as separate components, each coupled with a respective antenna.

The microprocessor 96 is coupled to the transceiver 102 for controlling the operation of the transmitter 104 and the receiver 106. A memory, such as a read-only memory ("ROM") 108, is coupled to the microprocessor 96 for storing programs and data for the microprocessor 96 to execute. Another memory, such as a random access memory ("RAM") 110, is also coupled to the microprocessor 96 for providing storage for data received by the receiver 106 and decoded by the microprocessor 96. Power for these components may be supplied via a power bus (not shown), from an external power supply, or from an internal power supply, such as one or more batteries (not shown).

Figure 6:
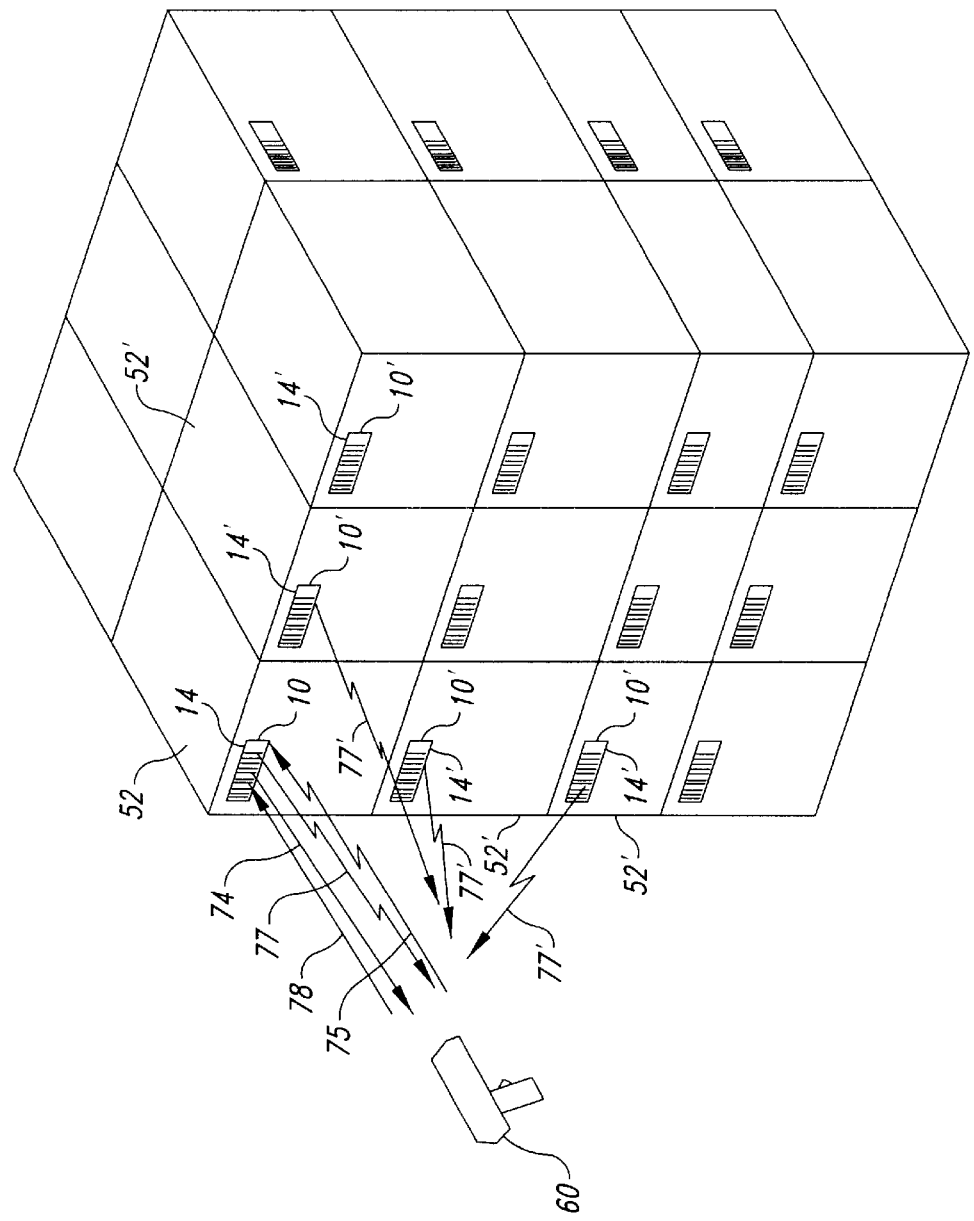
FIG. 6 is a perspective view of a number of containers carrying machine-readable symbols and RF tags.

FIG. 6 shows a number of containers 52, 52' in close proximity to each other. Each of the containers 52, 52' has a bar code symbol 14, 14' on an exposed surface of the container. While in the embodiment shown, the bar code symbols 14, 14' are carried on the substrate of the RF tags 10, 10', the bar code symbols 14, 14' may be printed directly onto the containers 52, 52' or applied to the containers 52, 52' as labels. Data pertaining to the containers 52, 52' or the contents of the containers 52, 52' may be encoded in each of the respective RF tags 10, 10'.

Due to the close proximity of the RF tags 10, 10' to one another, the reader 60 will receive data signals 77, 77' from a selected carton 52 and neighboring cartons 52', respectively. The reader 60 may employ a discrimination or arbitration scheme as is generally known in the art to prevent the data signals 77, 77' from interfering with one another. For example, the reader 60 may include information in the interrogation signal 75 to randomize the response of the RF tags 10, 10' by introducing a different time delay in the response of each of the RF tags 10, 10'.

The reader 60 generates an illumination beam 78 to scan the bar code symbol 14 of the selected container 52. The reader 60 receives the beam 74 reflected from the bar code symbol 14 on the selected container 52.

A first exemplary method of associating data with a particular RF tag 10 will be discussed with reference to FIGS. 6 and 7. In step 200 of routine 201, when a user desires information or data regarding a selected container 52 or the contents of the selected container 52, the user activates the reader 60 to read the bar code symbol 14 on the selected container 52. The reader 60 illuminates the bar code symbol 14 with an illumination beam 78 and receives the reflected light 74. In step 202, the reader 60 decodes the data encoded in the bar code symbol 14 to obtain a symbol identifier 19 (FIG. 1).

In step 204, the reader 60 checks a flag character 16 in the bar code symbol 14 (FIG. 1) to determine whether an RF tag 10 is associated with the bar code symbol 14. If no RF tag 10 is associated with the bar code symbol 14, the reader 60 transmits or stores data, for example, by storing data to an external memory (not shown), in step 206. To conserve power, the reader 60 may keep the RF section 64 in an OFF state if no RF tag 10 is associated with the bar code symbol 14. If an RF tag 10 is associated with the bar code symbol 14 in step 208, the reader 60 places the RF section 64 of the reader 60 into an ON state, supplying power to the RF section 64. In step 210, the reader 60 transmits the RF interrogation signal 75, receives an RF data signal 77 in response to the RF interrogation signal 75 and decodes the RF data signal 77 to obtain a memory device identifier 46 (FIG. 3).

Also to conserve power, the RF section 64 may initially transmit the RF interrogation signal 75 at a first relatively low power level. The RF section 64 may then transmit the RF interrogation signal 75 at a second relatively higher power level if no RF data signal 77 is returned from the RF tag 10.

In step 212, the reader 60 compares the memory device identifier 46 (FIG. 3) with the symbol identifier 19 to determine whether the RF data signal 77 corresponds with the scanned bar code symbol 14. The reader 60 successively receives and decodes the RF data signals 77, 77' until a match is found and may provide tactile feedback to the user in an audible, visual or other form when a match is found. For example, the reader 60 may produce a particular tone, or tone pattern when a match is found. Alternatively, or additionally, the reader 60 may flash a light such as an LED (not shown) when a match is found.

Once the reader 60 has linked or associated the appropriate RF data signal 77 with the scanned bar code symbol 14, the reader 60 may, in step 214, receive or transmit data either to or from the particular RF tag 10. In step 216, the reader 60 places the RF section 64 into an OFF state, discontinuing or reducing the power supply to the RF section 64. This permits the reader 60 to conserve power while it is not actively receiving RF data signals 77, 77' or transmitting RF interrogation signal 75.

Figure 7:
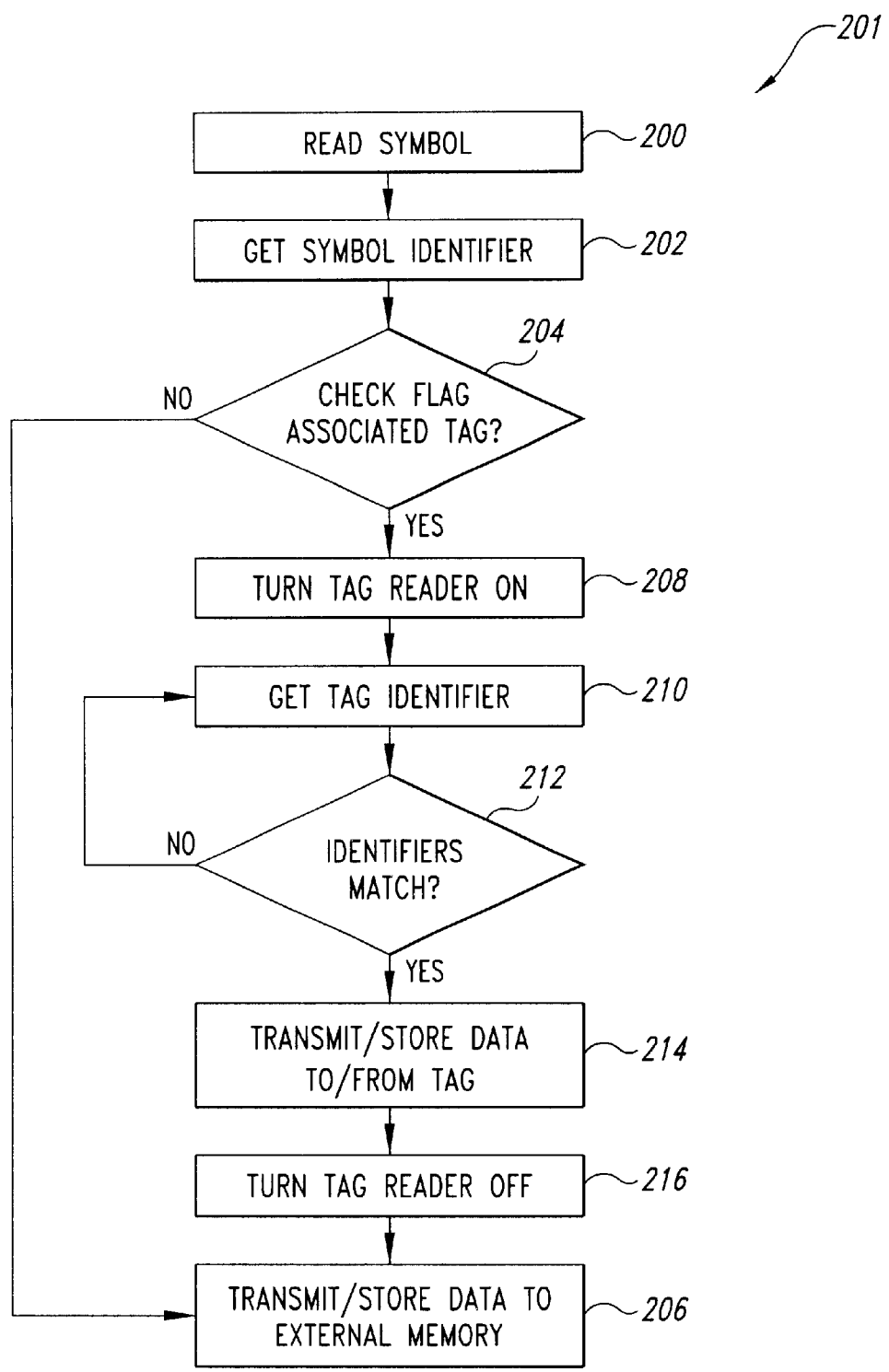
FIG. 7 is a flowchart showing the steps for associating data with a particular memory device according to a first embodiment, where a tag identifier encoded in an RF tag is matched to a tag identifier encoded in a machine readable symbol.
Figure 8:
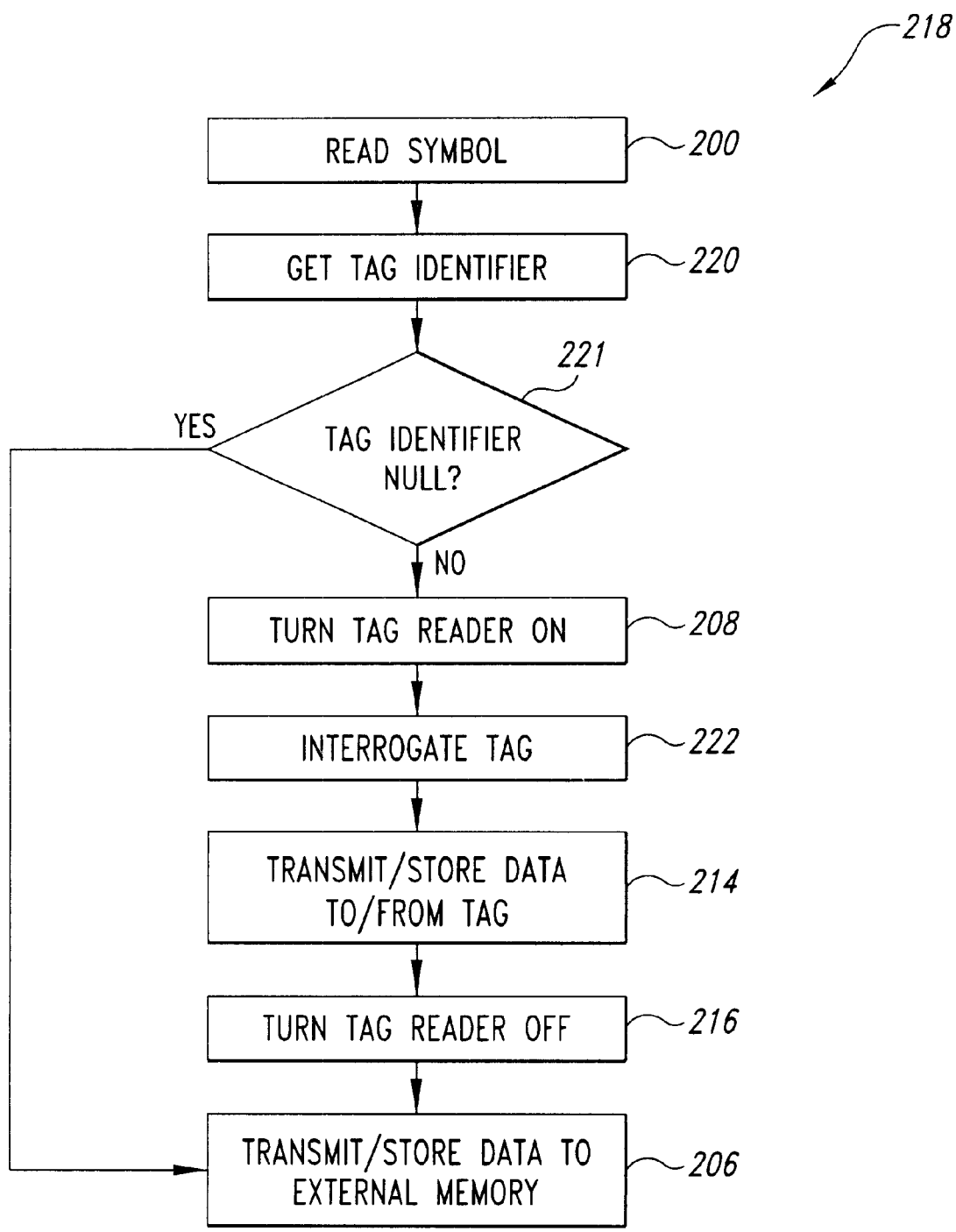
FIG. 8 is a flowchart showing the steps for associating data with a particular memory device using an alternative tag addressing schema, where a tag identifier encoded in a machine readable symbol is used to interrogate a specific RF tag.

As shown in FIG. 8, an alternative embodiment under the present invention employs a routine 218 that includes steps that are similar to routine 201 of FIG. 7. This alternative embodiment, and those described herein, are substantially similar to previously described embodiments, and common steps are identified by the same reference numbers. Only the significant differences in operation are described in detail.

In routine 218, the reader 60 reads the bar code symbol 14 in step 200, retrieves the tag identifier 46 in step 220 for any associated RF tag 10. In step 221, if the tag identifier 46 is null or some other pre-defined value, the data encoded in the bar code symbol 14 is transmitted to an external memory in step 206. If the tag identifier 46 is not null, then the RF section 64 of the reader 60 is turned ON in step 208 and performs an addressed interrogation in step 222. The addressed interrogation employs the tag identifier 46 to address only the specific RF tag 10 that the tag identifier 46 identifies.

Figure 9:
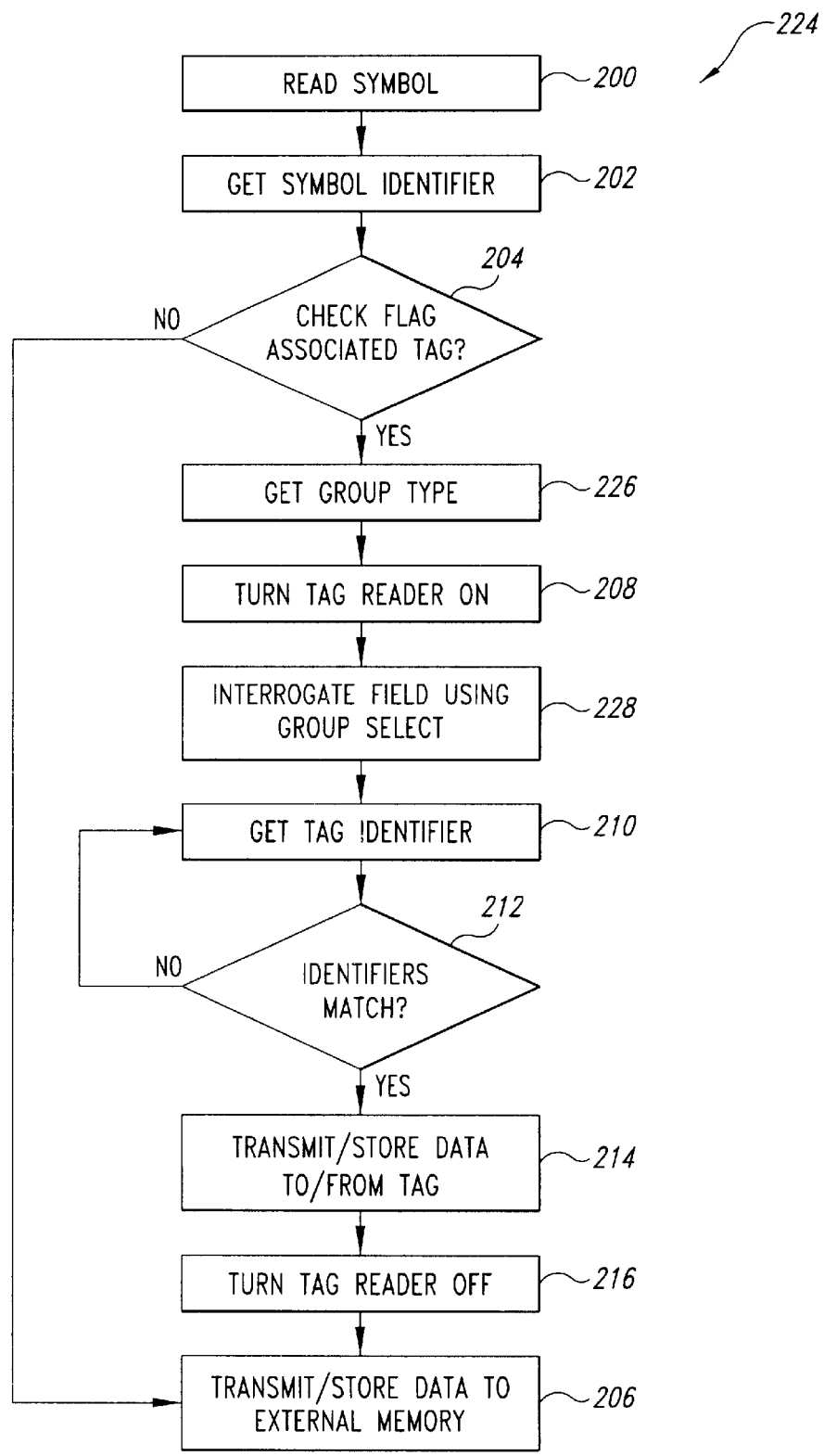
FIG. 9 is a flow chart showing the steps for associating data with a particular memory device using another alternative addressing schema, where a group of RF tags are interrogated.

Another alternative exemplary method is shown in FIG. 9. In FIG. 9, the reader 10 performs routine 224, reading the bar code symbol 14 (Step 200), retrieving the symbol identifier 19 (Step 202) from the read data and checking for associated RF tags 10 (Step 204). In step 226, the reader 10 also retrieves a group type from the read data, that identifies a group of related RF tags 10. For example, a bar code symbol 14 on the outside of a container 52 (FIG. 4) may encode a group type that is common to all RF tags 10 within the container 52, each item in the container 52 having an RF tag 10 physically associated therewith. Thus the group type corresponds to a particular container 52 and all items within the container 52. One skilled in the art will note that the group type does not need to be expressly encoded in the bar code symbol 14, and may be inferred from other encoded data such as the symbol identifier 19.

In step 208, the RF section 64 of the reader 10 is turned ON and in step 228 the RF section 64 interrogates all RF tags 10 within its range using the group type retrieved from the bar code symbol 14. A suitable method for performing a group select interrogation is disclosed in U.S. Pat. No. 5,673,037. In steps 210 and 212, the individual responses from the RF tags 10 may be sorted using the symbol identifier 19 and tag identifiers 46 in a fashion similar to that shown in FIG. 7.

Figure 10:
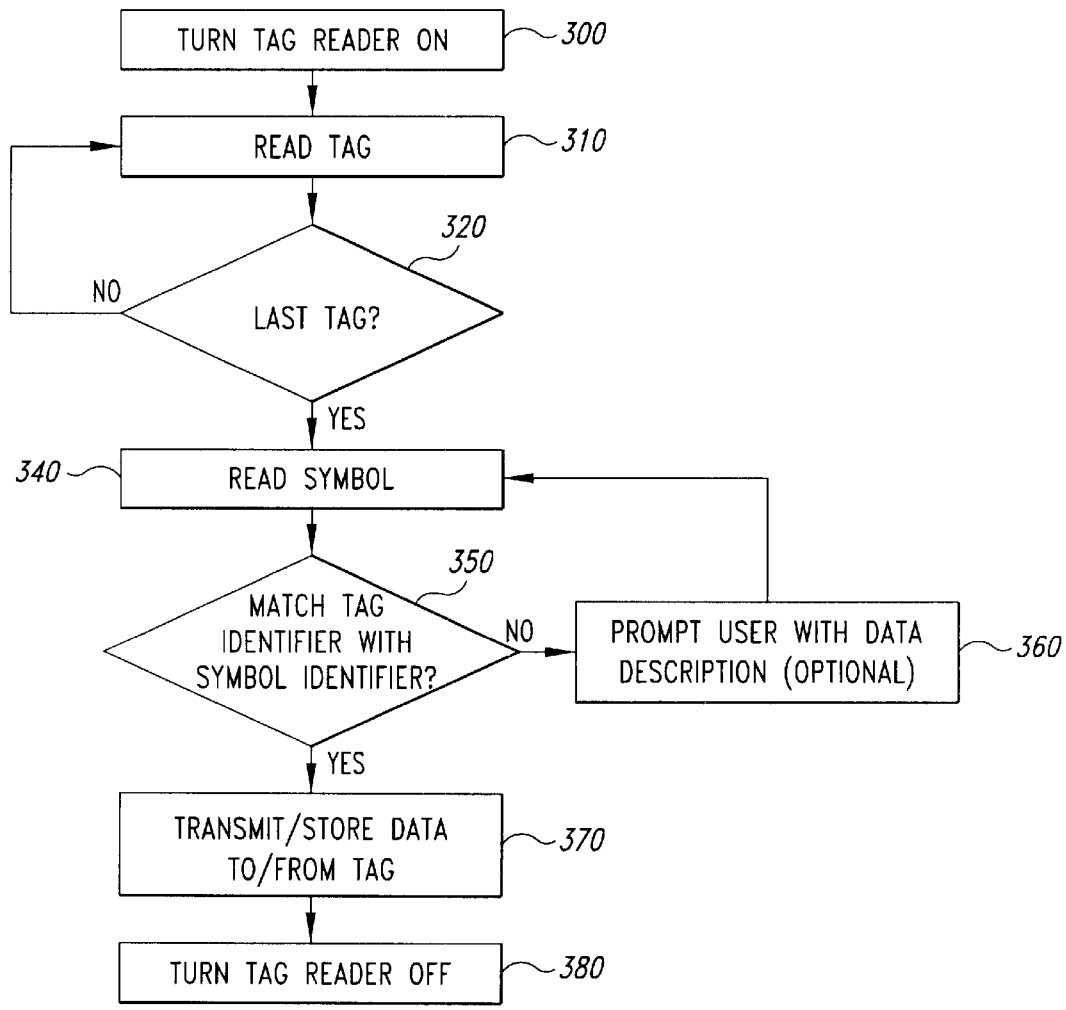
FIG. 10 is a flowchart showing the steps for associating data with a particular memory device according to a second exemplary embodiment where a number of RF tags are read and matched to a tag identifier encoded in a machine readable symbol.

A further exemplary method of associating data with an RF tag 10 will be discussed with reference to FIGS. 6 and 10. In step 300, the user places the RF section 64 of the reader 60 into an ON state. In steps 310 and 320, the reader 60 successively reads each of the RF tags 10, 10' by transmitting the RF interrogation signal 75 and receiving each of the RF data signals 77, 77'. In step 340, the user reads the bar code symbol 14 carried by a selected container 52. In step 350, the reader 60 attempts to match the symbol identifier 19 (FIG. 1) encoded in the bar code symbol 14 with the memory device identifier 46 (FIG. 3) encoded in the RF data signals 77, 77'. In optional step 360, the reader 60 prompts the user, for example, with a description of the data stored in the bar code symbol 14 if no match is found, and the reader 60 returns to reading bar code symbols 14, 14' (step 340). If a match is found, the reader 60 transmits and, or stores data to and, or from the RF tag 14, in step 370. In step 380, the RF section 64 of the reader 60 is placed into an OFF state, thereby conserving power.

Figure 11:
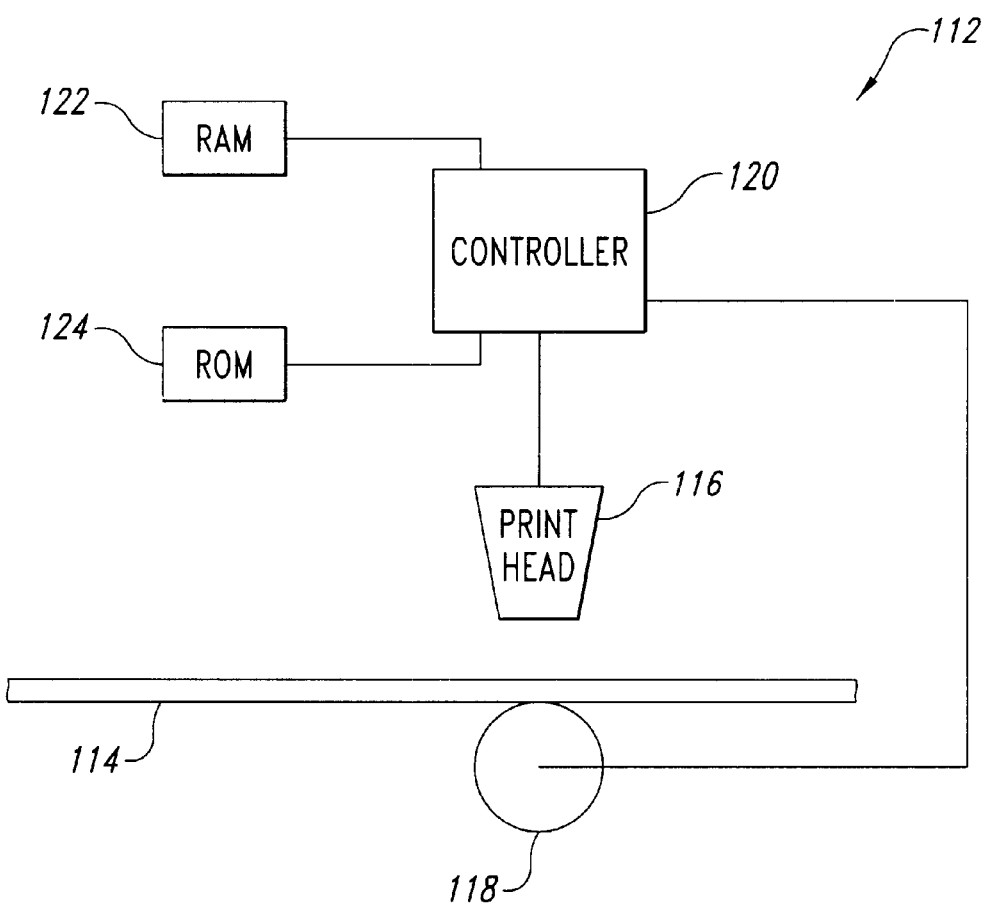
FIG. 11 is a block diagram of a printer for printing a machine-readable symbol according to an embodiment of the invention.

FIG. 11 shows a printer 112 for printing on a print medium 114. The print medium may be an RF tag 10 (FIG. 1), or may be a label or other substrate. The printer 112 includes a print head 116 for printing on the print medium 114 and may include a platen 118 for supporting and advancing the print medium 114 relative to the print head 116 for printing. The print head 116 may be a thermal print head, ink jet print head, laser print head or other conventional print head. The printer 112 further includes a controller 120 coupled to the print head 116 and the platen 118 for controlling and synchronizing the operation of the print head 116 and the platen 118. The controller 120 may further couple to a first memory, such as the RAM 122, and a second memory, such as the ROM 124, to retrieve and store data and instructions as is commonly known by those skilled in the art. The first or second memory 122, 124 may store instructions or printing a machine readable symbol, including at least one flag character 16 (FIG. 1) that indicate the existence of an associated RF tag 10 (FIG. 1).

Although specific embodiments of, and examples for, the present invention are described herein for illustrative purposes, various equivalent modifications can be made without departing from the spirit and scope of the invention, as will be recognized by those skilled in the relevant art. One skilled in the art will recognize that the teaching herein perceptually relates data to a memory device, as well as perceptually relating the data to an item or a container containing an item or group of items. The teachings provided herein of the present invention can be applied to reading other memory devices not necessarily the radio frequency tags generally described above. For example, the teachings may be employed with memory devices transmitting in bands of the electromagnetic spectrum other than radio frequency, although one skilled in the art will note that the disclosure is particularly suited to omnidirectional transmissions. The methods and apparatus may employ symbologies other than bar code symbols, such as stacked symbols and area symbols. Other methods of logically relating the symbol identifier and the memory device identifier may be employed, such as a lookup table, or an encryption scheme such as a public and private key encryption. RF tags and methods of relating RF tags and machine-readable symbols are discussed in U.S. patent application Ser. No. 09/064,886, filed Apr. 20, 1998; and U.S. patent application Ser. No. 09/021,608, filed Feb. 10, 1998, each of which are commonly assigned and incorporated herein by reference. Systems and methods for group selection are taught in U.S. Pat. No. 5,673,037, issued Sep. 30, 1997 and incorporated herein by reference.

These and other changes can be made to the invention in light of the above detailed description. In general, in the following claims, the terms used should not be construed to limit the invention to the specific embodiments disclosed in the specification and the claims, but should be construed to include all readers and memory devices that operate in accordance with the claims to provide an apparatus or a method for associating data with a specific memory device or item. Accordingly, the invention is not limited by the disclosure, but instead its scope is to be determined entirely by the following claims.

What is claimed is:

1. A system for storing and retrieving data comprising:
   a radio frequency tag having a memory for storing data;
   a first identifier stored in the memory of the radio frequency tag; and
   a machine readable symbol associated with the radio frequency tag, at least a portion of the machine readable symbol encoding a second identifier logically associable with the first identifier.

2. The system of claim 1 wherein the machine readable symbol is physically associated with the radio frequency tag.

3. The system of claim 1 wherein the machine readable symbol is carried by the radio frequency tag.

4. The system of claim 1 wherein the machine readable symbol is carried by a container and the radio frequency tag is carried by the container.

5. The system of claim 1 wherein the machine readable symbol and the radio frequency tag are carried by a container and the radio frequency tag stores data related to a contents of the container.

6. The system of claim 1 wherein the machine readable symbol and the radio frequency tag are carried by a container and the radio frequency tag stores data related to a destination of the container.

* * * * *